(12) United States Patent
Ko et al.

(10) Patent No.: US 12,080,289 B2
(45) Date of Patent: Sep. 3, 2024

(54) ELECTRONIC APPARATUS, SYSTEM COMPRISING ELECTRONIC APPARATUS AND SERVER AND CONTROLLING METHOD THEREOF

(71) Applicant: SAMSUNG ELECTRONICS CO., LTD., Suwon-si (KR)

(72) Inventors: Hyeonmok Ko, Suwon-si (KR); Dayoung Kwon, Suwon-si (KR); Jonggu Kim, Suwon-si (KR); Seoha Song, Suwon-si (KR); Kyenghun Lee, Suwon-si (KR); Hojung Lee, Suwon-si (KR); Saebom Jang, Suwon-si (KR); Pureum Jung, Suwon-si (KR); Changho Paeon, Suwon-si (KR); Jiyeon Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 334 days.

(21) Appl. No.: 17/486,252

(22) Filed: Sep. 27, 2021

(65) Prior Publication Data

US 2022/0199078 A1 Jun. 23, 2022

Related U.S. Application Data

(63) Continuation of application No. PCT/KR2021/008713, filed on Jul. 8, 2021.

(30) Foreign Application Priority Data

Dec. 22, 2020 (KR) .................. 10-2020-0181343

(51) Int. Cl.
*G10L 15/22* (2006.01)
*G06N 3/045* (2023.01)

(Continued)

(52) U.S. Cl.
CPC .............. *G10L 15/22* (2013.01); *G06N 3/045* (2023.01); *G10L 15/063* (2013.01); *G10L 15/26* (2013.01);

(Continued)

(58) Field of Classification Search
CPC ....... G10L 15/22; G10L 15/063; G10L 15/26; G10L 15/30; G10L 2015/223;

(Continued)

(56) References Cited

U.S. PATENT DOCUMENTS 6,456,974 B1 9/2002 Baker et al.
10,148,807 B2 12/2018 Kim et al.

(Continued)

FOREIGN PATENT DOCUMENTS

JP 2009-288991 12/2009
JP 2016-024469 2/2016

(Continued)

OTHER PUBLICATIONS

Kayande, Deepali, et al. "Performance analysis for improved RAM utilization for Android applications." 2012 CSI Sixth International Conference on Software Engineering (Conseg). IEEE, 2012, pp. 1-6 (Year: 2012).*

(Continued)

*Primary Examiner* — Andrew C Flanders
*Assistant Examiner* — Michael C. Lee
(74) *Attorney, Agent, or Firm* — Nixon & Vanderhye, P.C.

(57) ABSTRACT

Disclosed is an electronic apparatus. The electronic apparatus includes: a communication interface, a memory, and a processor connected to the memory and the communication interface, the processor configured to control the electronic apparatus to, based on receiving a speech related to a function of the electronic apparatus, obtain text information (Continued)

corresponding to the received speech, control the communication interface to transmit the obtained text information to a server including a first neural network model corresponding to the function, execute the function based on response information received from the server, and based on identifying that an update period of the first neural network model is greater than or equal to a first threshold period based on the information related to the function of the electronic apparatus, the electronic apparatus may receive the information about the first neural network model from the server and store the information in the memory.

11 Claims, 13 Drawing Sheets

(51) Int. Cl.
G10L 15/06 (2013.01)
G10L 15/26 (2006.01)
G10L 15/30 (2013.01)

(52) U.S. Cl.
CPC ........ *G10L 15/30* (2013.01); *G10L 2015/223* (2013.01)

(58) Field of Classification Search
CPC . G10L 15/16; G10L 2015/0635; G06N 3/045; G06N 3/08; G06F 3/167
See application file for complete search history.

(56) References Cited

U.S. PATENT DOCUMENTS

| | | | |
|---|---|---|---|
| 10,152,965 B2 | 12/2018 | Bruguier et al. | |
| 10,403,267 B2 | 9/2019 | Park et al. | |
| 10,699,704 B2 | 6/2020 | Kim et al. | |
| 10,720,217 B1* | 7/2020 | Tran | H10B 69/00 |
| 10,770,065 B2 | 9/2020 | Kim et al. | |
| 10,817,783 B1* | 10/2020 | Rotem | G06N 3/10 |
| 10,818,285 B2 | 10/2020 | Lee et al. | |
| 10,964,327 B2 | 3/2021 | Lee et al. | |
| 11,181,988 B1* | 11/2021 | Bellegarda | G06F 3/04886 |
| 11,189,282 B2 | 11/2021 | Jeong et al. | |
| 11,514,251 B2* | 11/2022 | Freeman | G06F 40/216 |
| 2013/0013543 A1* | 1/2013 | Dull | G05B 13/027 706/25 |
| 2013/0332147 A1* | 12/2013 | Corfield | G10L 15/065 704/E15.001 |
| 2015/0066503 A1* | 3/2015 | Achituv | G10L 15/197 704/235 |
| 2015/0325235 A1* | 11/2015 | Levit | G06F 40/295 704/257 |
| 2016/0162456 A1* | 6/2016 | Munro | G06F 16/24532 704/9 |
| 2017/0046616 A1* | 2/2017 | Socher | G06N 3/084 |
| 2017/0053646 A1* | 2/2017 | Watanabe | G06N 3/045 |
| 2017/0069310 A1* | 3/2017 | Hakkani-Tur | G10L 15/1815 |
| 2017/0140753 A1* | 5/2017 | Jaitly | G10L 15/02 |
| 2017/0147292 A1* | 5/2017 | Mauerer | G06F 8/33 |
| 2017/0230497 A1 | 8/2017 | Kim et al. | |
| 2018/0190280 A1* | 7/2018 | Cui | G10L 15/16 |
| 2018/0253648 A1* | 9/2018 | Kaskari | G06F 18/2413 |
| 2018/0276278 A1* | 9/2018 | Cagan | G06N 20/00 |
| 2018/0276532 A1* | 9/2018 | Kim | G06N 3/045 |
| 2019/0122106 A1* | 4/2019 | Lee | G06N 3/063 |
| 2019/0378495 A1* | 12/2019 | Kim | G10L 15/063 |
| 2020/0005788 A1 | 1/2020 | Jeong et al. | |
| 2020/0035244 A1 | 1/2020 | Kim | |
| 2020/0043471 A1* | 2/2020 | Ma | G10L 15/07 |
| 2020/0175360 A1* | 6/2020 | Conti | G06N 3/04 |
| 2020/0349940 A1 | 11/2020 | Ko et al. | |
| 2020/0349952 A1 | 11/2020 | Lee et al. | |
| 2021/0183393 A1 | 6/2021 | Lee et al. | |
| 2022/0148601 A1* | 5/2022 | Kracun | G10L 17/00 |
| 2022/0270590 A1* | 8/2022 | Beaufays | G06N 3/084 |

FOREIGN PATENT DOCUMENTS

| | | |
|---|---|---|
| KR | 10-2017-0093027 | 8/2017 |
| KR | 10-2017-0106951 | 9/2017 |
| KR | 10-2018-0070970 | 6/2018 |
| KR | 10-2019-0024148 | 3/2019 |
| KR | 10-2019-0104280 | 9/2019 |
| KR | 10-2020-0127814 | 11/2020 |

OTHER PUBLICATIONS

International Search Report and Written Opinion dated Oct. 18, 2021 in corresponding International Application No. PCT/KR2021/008713.

* cited by examiner

ELECTRONIC APPARATUS, SYSTEM COMPRISING ELECTRONIC APPARATUS AND SERVER AND CONTROLLING METHOD THEREOF

CROSS-REFERENCE TO RELATED APPLICATION(S)

This application is a continuation of International Application No. PCT/KR2021/008713 designating the United States, filed on Jul. 8, 2021, in the Korean Intellectual Property Receiving Office and claiming priority to Korean Patent Application No. 10-2020-0181343, filed Dec. 22, 2020, in the Korean Intellectual Property Office, the disclosures of which are incorporated by reference herein in their entireties.

BACKGROUND

1. Field

The disclosure relates to an electronic apparatus providing a voice assistance service, a system, and a controlling method thereof.

2. Description of the Related Art

A natural language understanding model may refer to a model for analyzing a user speech and identifying a user intent included in the user speech. This natural language understanding model may be separately present for respective applications.

When a natural language understanding model for all applications installed on an electronic apparatus such as a smartphone is to be stored, there may be a problem that a storage capacity of the electronic apparatus will increase.

When a natural language understanding model is received from a server and used as necessary, there may be a problem in that it takes time to receive the natural language understanding model and the natural language understanding model may not be received in a situation where network is not connected.

Accordingly, there is necessity to store only a natural language understanding model corresponding to an application frequently used according to a user's usage pattern on an electronic apparatus.

SUMMARY

Embodiments of the disclosure to provide an electronic apparatus for managing an artificial intelligence (AI) model related to an operation of an application based on a feature of an application and usage frequency of a user, a system including a server, and a controlling method thereof.

According to an example embodiment, an electronic apparatus includes: a communication interface, a memory, and a processor connected to the memory and the communication interface, the processor configured to control the electronic apparatus, wherein the processor may, based on receiving speech related to a function of the electronic apparatus, obtain text information corresponding to the received user speech, control the communication interface to transmit the obtained text information to a server, the server including a first neural network model corresponding to the function, execute the function based on response information received from the server, and based on identifying that an update period of the first neural network model is greater than or equal to a first threshold period based on the information related to the function of the electronic apparatus, the electronic apparatus may receive the information about the first neural network model from the server and store the information in the memory.

The processor may identify a function of the electronic apparatus corresponding to the obtained text information by inputting text information corresponding to the speech to a second neural network model, and control the electronic apparatus to transmit the information about the identified function and the obtained text information to the server.

The processor may, based on the update period of the first neural network model being greater than or equal to a first threshold period, and the usage frequency for the identified function being greater than or equal to a threshold numeral value, control the electronic apparatus to receive the information about the first neural network model from the server and store the information in the memory.

The processor may, based on the update period of the first neural network model being greater than or equal to a first threshold period and a data size of the first neural network model being less than a threshold size, control the electronic apparatus to receive the information about the first neural network model from the server and store the information in the memory.

The processor may, based on receiving a speech related to the function of the electronic apparatus after the information about the first neural network model is stored in the memory, control the electronic apparatus to obtain response information corresponding to the speech based on the information about the first neural network model stored in the memory.

The processor may identify an update period of the first neural network model based on at least one of a type and number of text corresponding to the speech related to the function of the electronic apparatus, and a type and number of response information related to the function of the electronic apparatus.

The response information related to the function of the electronic apparatus may include at least one of graphical user interface (GUI) response information or speech response information, and a type of the GUI response information may be different based on at least one of information about whether user interaction is requested or whether another device is in association.

The memory may include a volatile memory and a non-volatile memory, and the processor may, based on the update period of the first neural network model being greater than or equal to the first threshold period and less than a second threshold period, control the electronic apparatus to store the information about the first neural network model in the volatile memory, and based on the update period of the first neural network model being greater than or equal to the second threshold period, control the electronic apparatus to store the information about the first neural network model in the non-volatile memory.

The second threshold period may be a basic update period for a plurality of neural network models stored in the electronic apparatus.

According to an example embodiment, a system comprising an electronic apparatus and a server includes: an electronic apparatus configured to, based on receiving a speech related to a function of the electronic apparatus, obtain text information corresponding to the received speech, transmit the obtained text information to the server, the server including a first neural network model corresponding to the function, execute the function based on response information received from the server, and based on identifying that an update period of the first neural network model is greater than or equal to a first threshold period based on the information related to the function of the electronic apparatus, transmit a signal requesting information about the first neural network model to the server; and a server configured to, based on receiving a signal requesting information about the first neural network model from the electronic apparatus, transmit the information about the first neural network model to the electronic apparatus, wherein the electronic apparatus may store the information received from the server in a memory.

According to an example embodiment, a method of controlling an electronic apparatus according to an embodiment may include, based on receiving a speech related to a function of the electronic apparatus: obtaining text information corresponding to the received speech, transmitting the obtained text information to a server, the server including a first neural network model corresponding to the function, executing the function based on response information received from the server, identifying an update period of the first neural network model based on the information related to the function of the electronic apparatus, and based on identifying that the update period of the first neural network model is greater than or equal to a first threshold period, receiving information about the first neural network model from the server and storing the information.

The executing the function may include identifying a function of the electronic apparatus corresponding to the obtained text information by inputting text information corresponding to the speech to a second neural network model and transmitting the information about the identified function and the obtained text information to the server.

The receiving and storing the information about the first neural network model may include, based on the update period of the first neural network model being greater than or equal to a first threshold period and the usage frequency for the identified function being greater than or equal to a threshold numeral value, receiving the information about the first neural network model from the server and storing the information.

The receiving and storing the information about the first neural network model may include, based on the update period of the first neural network model being greater than or equal to a first threshold frequency and a data size of the first neural network model being less than a threshold size, receiving the information about the first neural network model from the server and storing the information.

The method may further include, after the information about the first neural network model is stored in the memory, based on receiving a speech related to the function of the electronic apparatus, obtaining response information corresponding to the speech based on the information about the first neural network model.

According to various example embodiments, an electronic apparatus may obtain and store a natural language understanding model in an electronic apparatus based on a life cycle of a natural language understanding model corresponding to a usage frequency of an application and an operation of the application, thereby efficiently performing natural language understanding for a speech even without network connection, as there is no necessity to download a natural language understanding model from an external server in real time. As communication with a server may be minimized and/or reduced, processing speed for speech recognition may become rapid and power consumption may be reduced. In addition, by minimizing and/or reducing leakage of personal information to the outside, a function to protect privacy may be improved.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Various example embodiments of the disclosure will be described in greater detail below with reference to the attached drawings.

The terms used in the disclosure and the claims are general terms identified in consideration of the functions of various embodiments of the disclosure. However, these terms may vary depending on intent, legal or technical interpretation, emergence of new technologies, and the like of those skilled in the related art. In addition, in some cases, a term may be arbitrarily selected, in which case the term will be described in detail in the description of the corresponding disclosure. Thus, the term used in this disclosure should be defined based on the meaning of term, not a simple name of the term, and the contents throughout this disclosure.

It is to be understood that the terms, such as "comprise" or "consist of" are used herein to designate a presence of a characteristic, number, operation, element, component, or a combination thereof, and not to preclude a presence of one or more of other characteristics.

The expression "At least one of A or/and B" should be understood to represent "A" or "B" or any one of "A and B."

As used herein, terms such as "first," and "second," may identify corresponding components, regardless of order and/or importance, and are used to distinguish a component from another without limiting the components.

If it is described that a certain element (e.g., first element) is "operatively or communicatively coupled with/to" or is "connected to" another element (e.g., second element), it should be understood that the certain element may be connected to the other element directly or through still another element (e.g., third element).

A singular expression includes a plural expression, unless otherwise specified. It is to be understood that the terms such as "comprise" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

Terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor (not shown).

In this disclosure, a user may refer to a person using an electronic apparatus. Example embodiments will be described in detail below with reference to the accompanied drawings.

Figure 1:
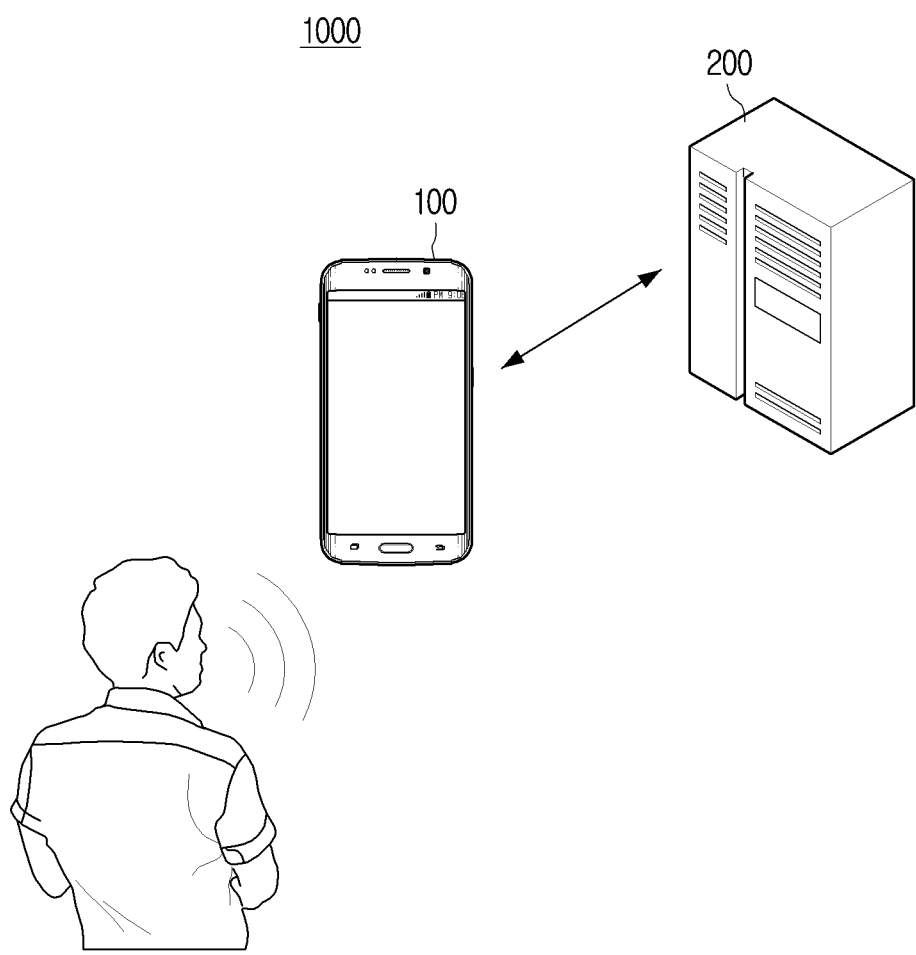
FIG. 1 is a diagram illustrating an example configuration of an electronic system according to various embodiments.

FIG. 1 is a diagram illustrating an example configuration of an electronic system according to various embodiments.

Referring to FIG. 1, an electronic system 1000 according to an embodiment includes an electronic apparatus 100 and a server 200.

According to an embodiment, the electronic apparatus 100 may be designed to perform natural language understanding about a user speech using a neural network model (or an AI model or a learning network model), and perform an application function based on the performed natural language understanding result. Here, unlike an artificial language such as a programming language, the natural language understanding may refer, for example, to identifying a user intent included in an ordinarily used natural language which does not necessarily follow predetermined rules in grammar. The neural network model performing the natural language understanding may be referred to as a natural language understanding model.

A function related to AI may be operated through a processor and a memory. The processor or a plurality of processors may include, for example, and without limitation, a general-purpose processor such as a central processing unit (CPU), an application processor (AP), a digital signal processor (DSP), a dedicated processor, or the like, a graphics-only processor such as a graphics processor (GPU), a vision processing unit (VPU), an AI-only processor such as a neural network processor (NPU), or the like. The one or a plurality of processors may control processing of the input data according to a predefined operating rule or a neural network model stored in a memory. If the one or a plurality of processors are an artificial intelligence (AI)-only processor, the AI-only processor may be designed with a hardware structure specialized for the processing of a particular AI model.

The pre-defined operating rule or neural network model may be made through learning. Here, being made through learning may refer, for example, to a predetermined operating rule or AI model set to perform a desired feature (or purpose) is made by making a basic AI model trained using various training data using learning algorithm. The learning may be accomplished by a device itself to perform AI according to an embodiment or accomplished through a separate server and/or system. Examples of learning algorithms include, but are not limited to, supervised learning, unsupervised learning, semi-supervised learning, or reinforcement learning.

The neural network model may include a plurality of neural network layers. Each of the plurality of neural network layers includes a plurality of weight values, and may perform a neural network processing operation through an iterative operation leveraging results of a previous layer and a plurality of weight values. The plurality of weight values included in the plurality of neural network layers may be optimized by training results of the neural network model. For example, the plurality of weight values may be updated such that a loss value or a cost value obtained by the neural network model is reduced or minimized during the training process. The artificial neural network may include a deep neural network (DNN) and may include, for example, but is not limited to, a convolutional neural network (CNN), a recurrent neural network (RNN), a restricted Boltzmann machine (RBM), a deep belief network (DBN), bidirectional recurrent deep neural network (BRDNN), a deep Q-network, or the like.

If the neural network model is a natural language understanding model according to an embodiment, the electronic apparatus 100 may include a natural language understanding model that identifies the intent of the user, and may further provide an artificial intelligence (AI) speech recognition assistant function. According to an embodiment, the speech recognition assistant function may refer to a service providing response information to the user when a speech of a user is input to the electronic apparatus 100.

The electronic apparatus 100 may be implemented in various formats such as, for example, and without limitation, a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), a moving picture experts group phase 1 or phase 2 (MPEG-1 or MPEG-2) audio layer 3 (MP3) player, a medical device, a camera, a wearable device, or the like.

The natural language understanding model may be separately present according to an application, and one or a plurality of natural language understanding models corresponding to one application may exist. Since the operations performed by each application may be different, the utterance content of the user input for respective applications may also be different. Accordingly, the natural language understanding model may be a model specialized for a corresponding application.

The server 200 may refer, for example, to a device to manage a plurality of natural language understanding model and may be implemented with, for example, and without limitation, a central server, a cloud server, or the like.

According to an embodiment, the server 200 may transmit a corresponding natural language understanding model to the electronic apparatus 100 based on a request of the electronic apparatus 100. For example, the electronic apparatus 100 may request to transmit a natural language understanding model to the server 200 if necessary based on an update period according to a feature of the natural language understanding model. The update period of the natural language understanding model may be referred to as a "life cycle."

According to various embodiments, when a natural language understanding model is obtained in the electronic apparatus 100, an operation corresponding to the user speech may be performed based on the obtained natural language understanding model.

Various embodiments of managing an AI model related to an operation of an application based on the feature of the application and the usage frequency of the user will be described in greater detail below with reference to the drawings.

Figure 2:
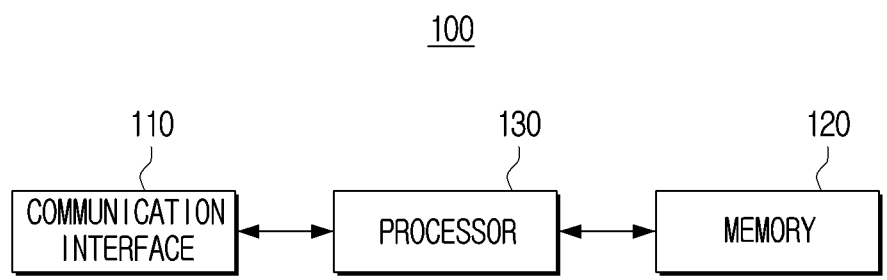
FIG. 2 is a block diagram illustrating an example configuration of an electronic apparatus according to various embodiments.

FIG. 2 is a block diagram illustrating an example configuration of an electronic apparatus according to various embodiments.

Referring to FIG. 2, the electronic apparatus 100 according to an embodiment may include a communication interface (e.g., including communication circuitry) 110, a memory 120, and a processor (e.g., including processing circuitry) 130.

The communication interface 110 may include various communication circuitry and be configured to receive and output various types of data. For example, the communication interface 110 may receive and transmit various types of data with an external device (e.g., a source device), an external storage medium (e.g., a universal serial bus (USB) memory), an external server (e.g., a webhard) through communication methods such as, for example, and without limitation, an access point (AP)-based wireless fidelity (Wi-Fi) (wireless local area network (WLAN)), Bluetooth, Zigbee, wired/wireless LAN, wide area network (WAN), Ethernet, IEEE 1394, high definition multimedia interface (HDMI), universal serial bus (USB), mobile high-definition link (MHL), advanced encryption standard (AES)/European broadcasting union (EBU), optical, coaxial, or the like.

The memory 120 may store data necessary for various embodiments. The memory 130 may be implemented as at least one of a memory embedded within the electronic apparatus 100 or a memory detachable from the electronic apparatus 100 according to the usage of data storage. For example, the data for driving the electronic apparatus 100 may be stored in the memory embedded within the electronic apparatus 100, and the data for upscaling of the electronic apparatus 100 may be stored in the memory detachable from the electronic apparatus 100. A memory embedded in the electronic apparatus 100 may be implemented as at least one of a volatile memory such as a dynamic random access memory (DRAM), a static random access memory (SRAM), a synchronous dynamic random access memory (SDRAM), or a non-volatile memory (e.g., one time programmable ROM (OTPROM), programmable ROM (PROM), erasable and programmable ROM (EPROM), EEPROM, mask ROM, flash ROM, a flash memory (e.g., NAND flash or NOR flash), a hard disk drive (HDD), a solid state drive (SSD), or the like. A memory detachably mounted to the electronic apparatus 100 may be implemented as a memory card (e.g., a compact flash (CF), a secure digital (SD), micro secure digital (micro-SD), a mini secure digital (mini-SD), an extreme digital (xD), a multi-media card (MMC), etc.), an external memory (e.g., a universal serial bus (USB) memory, or the like) connectable to the USB port, or the like.

The processor 130 may include various processing circuitry and control overall operation of the electronic apparatus 100. The processor 130 may be connected to each configuration of the electronic apparatus 100 and may control operations of the electronic apparatus 100. For example, the processor 130 may be connected to the communication interface 110 and the memory 120 and may control the operation of the electronic apparatus 100.

According to an embodiment, the processor 130 may include various processing circuitry including, for example, and without limitation, a digital signal processor (DSP), a microprocessor, a central processing unit (CPU), a micro controller unit (MCU), a micro processing unit (MPU), a neural processing unit (NPU), a controller, an application processor (AP), or the like, but in the disclosure, the processor 130 will be used.

The processor 130 may be implemented with a system on chip (SoC) or large scale integration (LSI), or may be implemented with field programmable gate array (FPGA) format. The processor 130 may include a volatile memory such as SRAM.

The processor 130, based on receiving a user speech related to a function of the electronic apparatus 100, may obtain text information corresponding to the received speech.

The function of the electronic apparatus according to an example may be a function corresponding to the operation of the at least one application in the electronic apparatus 100. The functionality of the electronic apparatus may include some of the AI speech recognition assistant functions provided by recognizing the user's speech associated with the operation of the at least one application running on the electronic apparatus 100.

The processor 130 according to an embodiment may obtain text information corresponding to a user speech related to a function through a software module stored in the memory 120.

The processor 130 may control the communication interface 110 to transmit the obtained text information to the server 200 including a first neural network model corresponding to a function of the electronic apparatus. The first neural network model may be a natural language understanding model corresponding to a function of the electronic apparatus.

The processor 130 may perform a function based on the response information received from the server. The processor 130 according to an embodiment may provide response information corresponding to a result of performing the speech recognition of the user to the user, and the response information according to an example may be information related to a user interface (UI) to be provided to the user.

The processor 130 according to an embodiment may receive information on the first neural network model from the server and store the information in the memory 120 when the update period of the first neural network model is identified as being greater than or equal to the first threshold period based on the information related to the function of the electronic apparatus. The update of the neural network model may refer, for example, to updating various parameters included in the neural network model. The update period of the neural network model may be a time interval at which a change in a parameter included in the neural network model is required to provide a smooth speech service to the user.

Since data related to the update of the neural network model is generally provided by the server, if the neural network model having a short update period is stored in the electronic apparatus 100, proceeding updating may not be smooth, but for a model having a long update period, even if the neural network model is stored in the electronic apparatus 100, updating would not have a problem, so it may be effective to store the neural network model in the electronic apparatus 100.

In the disclosure, it is assumed that "update period of model" and "life cycle of model" have the same or similar meaning and the words may be used interchangeably.

The information about the first neural network model may refer, for example, to a set of information forming the first neural network model, or may refer to some information among information forming the first neural network model.

According to an example, the processor 130 may transmit, to the server 200, a signal requesting information on the first neural network model identified as having the update period greater than or equal to the first threshold period, and may receive information on the first neural network model from the server 200 and store the received information in the memory 120.

Although the text information corresponding to the user speech may be transmitted to the server 200 in various embodiments, the processor 130 may identify the function of the electronic apparatus corresponding to the obtained text information by inputting the text information corresponding to the user speech into the second neural network model, and may transmit the information on the identified function to the server 200 along with the obtained text information.

The second neural network model according to an example may be a model trained to receive text information and output information on a function group corresponding to the corresponding text information. The processor 130 may identify a function group corresponding to the text information through the second neural network model. In the disclosure, the functional group identified through the second neural network model according to an example may be referred to as a "domain." For example, the domain may be a category divided according to a function executable in the electronic apparatus 100, such as a message domain, a schedule domain, a reminder domain, or the like.

For example, the processor 130 may input the text corresponding to the user speech "please turn on the selfie mode of the A camera application" to the second neural network model to obtain domain information corresponding to the text, for example, "camera domain" information.

As another example, the processor 130 may input only a specific keyword (e.g., a "A camera application") among a text corresponding to user speech "please turn on selfie mode of A camera application" to a second neural network model to obtain domain information corresponding to the text, for example, "camera domain". The specific keyword may include, for example, a text including a predetermined word.

The processor 130 according to an embodiment may request information about the first neural network model to the server 200 if not only the update period of the first neural network model but also a frequency of user of a function corresponding to the user speech satisfies a specific condition.

For example, the processor 130 may receive information on the first neural network model from the server 200 and store the information in the memory 120 if the update period of the first neural network model is greater than or equal to the first threshold period and the frequency of use for the identified function is greater than or equal to a threshold value.

As for a function which is frequently used by the user, it may be more suitable to provide a smooth service by performing the process related to the function by the electronic apparatus rather than by the server 200 and thus, the processor 130 may transmit a signal requesting information about the first neural network model to the server 200.

If the frequency of use for the identified function is less than the threshold value, the processor 130 may not store the first neural network model in the electronic apparatus 100. In this case, the processor 130 may not identify the update period of the first neural network model.

The processor 130 according to an embodiment may request information about the first neural network model to the server 200, when not only the update period of the first neural network model but also the data size of the first neural network model satisfies a specific condition.

According to an embodiment, the processor 130 may, based on the update period of the first neural network model being greater than or equal to a first threshold period and a data size of the first neural network model being less than a threshold size, receive the information about the first neural network model from the server 200 and store the information in the memory 120.

Even if a model with a long update period, e.g., the data size is large, it may not be suitable to be stored in the electronic apparatus 100 due to limitation of storage capacity and the processor 130, only when the data size of the first neural network model is less than a threshold size, may receive information about the first neural network model from a server and store the information in the memory 120.

The processor 130 may receive, from the server 200, information about the first neural network model according to various conditions and store the information in the memory 120.

The processor 130 may, based on receiving a user speech related to the function of the electronic apparatus 100, obtain response information corresponding to the user speech based on the information about the first neural network model stored in the memory 120. The processor 130 may not receive response information corresponding to a speech recognition performance result from the server 200 or receive only some response information to execute a function corresponding to the user speech.

The processor 130 may identify an update frequency of the first neural network model based on at least one of a type and number of text corresponding to the user speech related to the function of the electronic apparatus, and a type and number of response information related to the function of the electronic apparatus. This will be described in greater detail below with reference to FIGS. 6A, 6B, and 8.

The response information related to the function of the electronic apparatus may include, for example, and without limitation, at least one of graphical user interface (GUI) response information or speech response information, and a type of the GUI response information may be different according to at least one of information about whether user interaction is requested or whether another device is in association.

For example, when the user receiving the response information has to perform an interaction in which the electronic apparatus 100 is directed toward a TV, the processor 130 according to an example may provide an illustration-type graphical user interface (GUI) response information depicting the interaction. As another example, when a user who receives response information should perform an interaction corresponding to a fingerprint recognition operation, the processor 130 according to an example may provide a pictogram-type GUI response information corresponding to a fingerprint recognition operation According to an embodiment, the memory 120 may include a volatile memory and a non-volatile memory, and the processor 130 according to an embodiment may, based on the update period of the first neural network model being greater than or equal to the first threshold period and less than a second threshold period, store the information about the first neural network model in the volatile memory, and based on the update period of the first neural network model being greater than or equal to the second threshold period, store the information about the first neural network model in the non-volatile memory. The second threshold period may be a basic update period for a plurality of neural network models stored in the electronic apparatus 100. For example, the second threshold period may be set upon manufacturing the electronic apparatus 100, or the second threshold period may be set or changed according to a circumstance of use of a plurality of neural network models. The second threshold period may be set with a period selected by the user.

According to an embodiment, it may be favorable to manage storage capacity and reduce power consumption of the electronic apparatus 100 to store a model having a relatively long update period in a non-volatile memory and store a model having a relatively short update period in a volatile memory.

The electronic apparatus 100 according to an embodiment may update a plurality of neural network models stored in the memory 120 by communicating with a server per basic update period. The processor 130 according to an embodiment may store the information about the first neural network model in the non-volatile memory when the period of the first neural network model is longer than the basic update period.

Figure 3A:
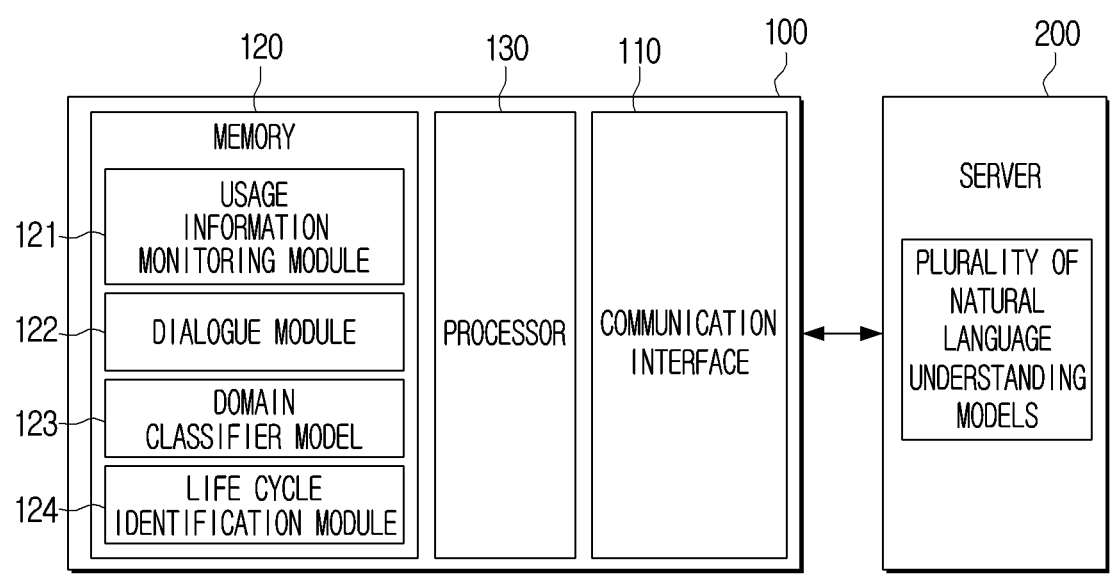
FIGS. 3A and 3B are block diagrams illustrating an example configuration of an electronic apparatus according to various embodiments.
Figure 3B:
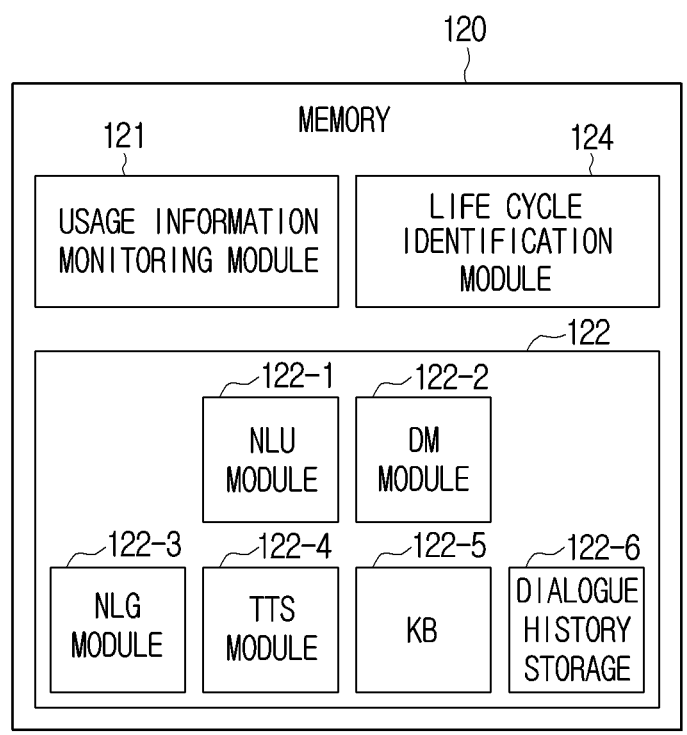

FIGS. 3A and 3B are block diagrams illustrating an example configuration of an electronic apparatus according to various embodiments. Respective blocks in FIGS. 3A and 3B may include a plurality of modules related to a functional configuration of the electronic apparatus 100. A plurality of modules according to an embodiment may include a software module stored in the memory 120 of the electronic apparatus 100 or hardware module implemented as a circuitry on the electronic apparatus 100 or any combination thereof (e.g., various processing circuitry and/or executable program elements). Each of a plurality of modules may be implemented with a format in which software and hardware are combined.

In the disclosure, a function of the electronic apparatus 100 will be described, by way of non-limiting example, based on assumption that functions performed by a plurality of modules are to be performed by the processor 130 that is an element of the electronic apparatus 100.

FIG. 3A is a block diagram illustrating an example of receiving a natural language model from a server according to various embodiments.

The electronic apparatus 100 may include the communication interface (e.g., including communication circuitry) 110, the memory 120, and the processor (e.g., including processing circuitry) 130.

The communication interface 110 may include circuitry and may communicate with the server 200.

The communication interface 110 may transmit usage information to the server 200 through wired or wireless communication, and may receive a natural language understanding model corresponding to the identified application based on the usage information from the server 200. The usage information according to an example may be information about text information or a natural language understanding model corresponding to a user speech.

The communication interface 110 may transmit identification information of the electronic apparatus 100 as well as the usage information under the control of the processor 130. The identification information may include, for example, and without limitation, an Internet protocol (IP) address, a model name, a device name, a serial number, or the like, of the electronic apparatus 100. The server 200 may determine an object to be transmitted with a natural language understanding model based on the transmitted identification information.

The memory 120 may be electrically connected to the processor 130 and may store necessary data for various embodiments.

The memory 120 may store a natural language understanding model transmitted from the server 200. The domain classifier model (e.g., including various processing circuitry and/or executable program elements) 123 according to an embodiment may include a neural network model that receives text information corresponding to the user speech and identifies a domain corresponding to the text. According to an embodiment, the memory 120 may store a usage information monitoring module (e.g., including various processing circuitry and/or executable program elements) 121, a dialogue module (e.g., including various processing circuitry and/or executable program elements) 122, a domain classifier model (e.g., including various processing circuitry and/or executable program elements) 123, and a life cycle identification module (e.g., including various processing circuitry and/or executable program elements) 124.

The usage information monitoring module 121 may be a module for monitoring user input information related to an application and usage information of an application according to a user input. The usage information monitoring module 121 may monitor usage information on the domain and intent information related to the user speech obtained through the neural network model of the speech recognition assistant service.

According to an example, the usage information monitoring module 121 may monitor usage information for the application. The usage information monitoring module may monitor the number of times that a corresponding operation is performed and a time at which the application is executed by touching an icon for performing an application by a pen or a user body (e.g., fingers) or an icon for performing a function included in an application icon.

According to another example, the usage information monitoring module 121 may monitor usage information for the speech recognition assistant. For example, when a user speech is input, an automatic speech recognition (ASR) model included in the usage information monitoring module 121 may convert the user speech into text.

The ASR model according to an example may include various processing circuitry and/or executable program elements and perform speech recognition on the input user speech and may output text corresponding to the recognized speech. For example, if the user speech "how is the weather today" is input, the ASR experience model may recognize the user speech and may output a text corresponding to the recognized speech, "how is the weather today."

If the user speech is converted into text, at least one domain related to the user speech may be identified through the domain classifier concept model 123 of the speech recognition assistant service. The domain may be information related to an application. For example, the domain may refer, for example, to an application itself or may refer, for example, to a category of the application. For example, a domain of A application associated with music may be an A application itself or a music category.

The usage information monitoring module 121 may monitor the number of times the specific domain has been identified through the neural network model of the speech recognition assistant service, and may transmit the identification information for the corresponding domain to the server 200 when the number of times identified for one domain is equal to or greater than the threshold number. The identification information for the domain may refer to information for identifying one domain to be distinguished from another domain, and may include a name, a title, identification (ID) information, identifier, or the like, of the domain. Accordingly, the electronic apparatus 100 may receive a natural language understanding model corresponding to the domain from the server 200. As described in FIG. 2, the usage information monitoring module 121 may monitor the frequency that a specific domain is identified through the neural network model of the speech recognition assistant service, and may transmit the identification information for the corresponding domain to the server 200 when the frequency identified for one domain is greater than or equal to a threshold value.

The server 200 may request the electronic apparatus 100 to transmit information on the frequency of identification for the domain at a predetermined period. In this case, the electronic apparatus 100 may transmit information on the frequency identification number to the server 200 even when the frequency of identification of the domain is less than the threshold number, and the server 200 may accumulate information on the number of times that the domain is periodically received, and may identify whether the number of identification for the domain is greater than or equal to a threshold number. If it is identified that the number of times for the specific domain is equal to or greater than a threshold number, the server 200 may transmit a natural language understanding model corresponding to the domain to the electronic apparatus 100.

As another example, after at least one domain related to user speech is identified through a domain classifier model 123, natural language understanding may be performed through a dialogue module 122 and intent information of a user corresponding to the user speech may be obtained.

The usage information monitoring module 121 may monitor the identification number of the specific intent information through the neural network model of the speech recognition assistant service, and may transmit the identification information for the intent information to the server 200 when the number of times identified for one intent information is equal to or greater than a threshold number. The identification information for the intent information may refer, for example, to information for identifying one intent information to be distinguished from other intent information, and may include, for example, and without limitation, to a name, a title, identification (ID) information, an identifier, or the like, of the intent information. The electronic apparatus 100 may receive a natural language understanding model corresponding to the intent from the server 200. The server 200 may request transmission of usage information on the intent information to the electronic apparatus 100 at a predetermined period. The electronic apparatus 100 may transmit the identification information on the intent information to the server 200 even when the number of identification of the intent information is less than the threshold number, and the server 200 may accumulate identification information on the intent information periodically received, and may identify whether the number of times the identification number for the intent information is greater than or equal to a threshold number. If it is identified that the identification number for the intent information is greater than or equal to a threshold number, the server 200 may transmit a natural language understanding model corresponding to the intent information to the electronic apparatus 100.

The usage information monitoring module 121 may obtain usage information about the domain and intent information identified in the speech recognition assistant service even before the application is executed. As the usage information for the domain and intent information is transmitted to the server 200, a natural language understanding model corresponding to the domain and intent information may be received from the server 200 regardless of the execution of the application.

As another example, the usage information monitoring module may monitor the number of times of execution of the application through the speech recognition assistant or the number of functions included in the application. For example, the speech recognition assistant model may store usage information based on user input in a separate memory connected to the memory 120 or the speech recognition assistant, and the usage information monitoring module may obtain the stored usage information.

Although the use information monitoring module has been described as being monitored based on domain information or intent information in the above-described embodiment, it is possible to monitor the operation information of the application. For example, the usage information monitoring module may monitor the number of identification of the application operation information corresponding to the user input, and may transmit the identification information for the corresponding operation information and the identification information for the application performing the corresponding operation information to the server 200 when the number of times identified for one operation information is equal to or greater than a threshold number. The identification information for the operation information may refer to information for identifying that one operation is distinguished from another operation, and may include name, title, identification information, slot information included in the operation, and the like. The electronic apparatus 100 may receive resource information and application information corresponding to a corresponding operation from the server 200, and the electronic apparatus 100 may train or generate a natural language understanding model based on resource information and application information received from the server 200. The server 200 may train or generate a natural language understanding model based on the identification information of the operation received from the electronic apparatus 100 and the identification information of the application, and may transmit the generated natural language understanding model to the electronic apparatus 100.

The server 200 may request transmission of usage information for the operation information to the electronic apparatus 100 at a predetermined period. The electronic apparatus 100 may transmit the identification information for the operation information to the server 200 even when the number of identification of the operation information is less than the threshold number, and the server 200 may accumulate the identification information for the periodically received operation to identify whether the identification number for the operation information is greater than or equal to a threshold number. If it is identified that the identification number for the operation information is greater than or equal to a threshold number, the server 200 may transmit the resource information or the natural language understanding model corresponding to the operation information to the electronic apparatus 100.

It has been described that the usage information monitoring module may be included in the electronic apparatus 100, but the usage information monitoring module may be included in the server 200. If natural language understanding about the user speech is performed in the server 200, the server 200 may monitor usage information for the application through the usage information monitoring module.

When a user speech is input to the electronic apparatus 100, the electronic apparatus 100 may obtain text corresponding to the user speech through the speech recognition model. The text corresponding to the user speech may be obtained through a speech recognition model present in the electronic apparatus 100, but this is merely an example and the text may be obtained through a speech recognition model of another server.

The electronic apparatus 100 may transmit the text obtained for the natural language understanding to the server 200. The server 200 may use the obtained text as input data of a domain classifier model 123 included in a natural language understanding model. The server 200 may obtain domain or intent information related to the text obtained through the domain classifier model 123. However, as described above, the server 200 may receive the user speech from the electronic apparatus 100 and obtain text corresponding to the user speech through a speech recognition model provided in the server 200. The electronic apparatus 100 may transmit user speech or text corresponding to user speech to the server 200, as shown below.

For example, it is assumed that the domain classifier model 123 of the electronic apparatus 100 may not identify the domain from the text corresponding to the user speech input to the electronic apparatus 100. The electronic apparatus 100 may transmit user speech or text corresponding to user speech to the server 200. When domains for user speech or text received from the electronic apparatus 100 are identified through the domain classifier model 123 of the server 200, the usage information monitoring module 121 of the server 200 may monitor usage information for respective domains, that is, domain-specific domains. When the intent information for the user speech or the text is identified after the domain identification, the usage information monitoring module 121 of the server 200 may monitor the identification number for intent information, that is, usage information for the intent information-specific intent information.

As another example, if the domain is identified through the domain classifier model 123 of the electronic apparatus 100 from the text corresponding to the user speech input, but the intent information is not identified, the electronic apparatus 100 may transmit the identified domain information, user speech, or text to the server 200. The server 200 may identify intent information for the user speech based on the received domain information, the user speech or text. The usage information monitoring module 121 of the server 200 may monitor the identification number for each intent information, that is, usage information for intent information-specific intent information.

As described above, when domain or intent information is identified in the server 200, the usage information monitoring module 121 of the server 200 may obtain usage information about the domain or intent information. The usage information monitoring module of the server 200 may sum usage information previously received from the electronic apparatus 100 and usage information obtained by the server 200. Accordingly, the server 200 may identify a natural language understanding model corresponding to the summed usage information, and transmit the identified natural language understanding model to the electronic apparatus 100.

Since the natural language understanding model associated with the user speech or the text corresponding to the user speech is not included on the electronic apparatus 100, as described above, the electronic apparatus 100 may request the server 200 to identify domain or intent information associated with the user speech (or text). The electronic apparatus 100 may include a natural language understanding model corresponding to the user speech (or text) received from the server 200. If a user speech (or text) associated with the natural language understanding model received from the server 200 is input to the electronic apparatus 100, the electronic apparatus 100 may identify domain or intent information related to the user speech, and thus may not request identification of the domain or intent information to the server 200.

In other words, if the electronic apparatus 100 identifies the domain related to the user speech or the text corresponding to the user speech through the domain classifier model 123 of the electronic apparatus 100, and identify the intent information in the domain, that is, the information of a specific function of the application, the electronic apparatus 100 may not separately request the identification of the domain or the intent information to the server 200, and if a preset condition is satisfied, may transmit, to the server 200, the usage information obtained according to the request of the server 200.

The life cycle identification module 124 according to an embodiment may be configured to identify an update period of a natural language understanding model corresponding to a user speech (or text). According to an embodiment, the life cycle identification module 124 may identify an update period of a natural language understanding model corresponding to a domain identified based on at least one of type and number of user speech (or text) corresponding to a domain identified by the domain classifier concept model 123, or type and number of response information related to the identified domain.

The usage information monitoring module 121 may transmit a signal requesting information about the natural language understanding model to the server 200 when the identified update period of the natural language understanding model is greater than or equal to a threshold period. The server 200 may transmit the natural language understanding model corresponding to the model to the electronic apparatus 100.

A specific method of identifying an update period of a natural language understanding model by the life cycle identification module 124 will be described in greater detail below with reference to FIGS. 6A, 6B, 7A, 7B and 8.

The processor 130 may include various processing circuitry and be electrically connected to the memory 120 and may control the overall operation of the electronic apparatus 100. The processor 130 may generally control the operation of the electronic apparatus 100 using various instructions or programs stored in the memory 120. According to an embodiment, the main CPU may copy the program to the RAM according to the instructions stored in the ROM, access the RAM, and execute the corresponding program. Here, the program may include a natural language understanding model, or the like.

The processor 130 may load the usage information monitoring module 121, the dialogue module 122, and the domain classifier model 123 stored in the memory 120 to the processor 130. For example, the processor 130 may load the usage information monitoring module 121, the dialogue module 122, the domain classifier model 123, and the life cycle identification module 124 stored in the memory 120 outside the processor 130 into a memory (not shown) inside the processor 130.

FIG. 3B is a block diagram illustrating an example configuration of the dialogue module 122 according to various embodiments.

The dialogue module 122 according to an example may include a plurality of software modules that may be controlled by the processor 130, as shown in FIG. 3B. According to an embodiment, the dialogue module 122 may be a module configured by combining at least one module of a natural language understanding model. Accordingly, it should be understood that the term "natural language understanding model" used herein may not have the same meaning as the dialogue module 122 shown in FIG. 3B, but it should be understood that the dialogue module 122 according to an example may perform a certain function among the functions of the natural language understanding model.

According to an example, a plurality of dialogue modules may be stored in the memory 120 for each domain corresponding to the electronic apparatus 100. Referring to FIG. 3B, the dialogue module 122 corresponding to a specific domain is illustrated, but a specific domain according to an example is assumed to be a domain corresponding to a user speech, and the operation of each module will be described.

The NLU module 122-1 may determine user intent and parameters using the matching rule divided into a domain of a user speech, a parameter (or a slot) for grasping the intent, based on the speech recognition result (text) obtained through the ASR model included in the user information monitoring module 121. For example, one domain (e.g., an alarm) may include a plurality of intents (e.g., alarm setting, alarm cancellation, or the like), and one intent may include a plurality of parameters (e.g., time, repetition times, alarm sound, or the like). The matching rule may be stored in the NLU database. The NLU module 122-1 may grasp the meaning of a word extracted from a user input using a linguistic characteristic (e.g., a grammatical element) such as a morpheme or a phrase, and determine a user intent by matching the grasped meaning with the domain and the intent.

According to an embodiment, the NLU module 122-1 may transmit the determined information about the domain and intent to the domain classifier model 123 and the domain classifier model 123 may identify the domain corresponding to the user speech based on the received information.

For example, if the text corresponding to the user speech obtained through the ASR model is "how is the weather today", the NLU module 122-1 may identify the meaning of a word, such as "weather today", "how is", or the like, and classify that the domain of the text is "weather" and may obtain the intent of the user requesting information about the today's weather.

The DM module 122-2 may determine whether the intent of the user grasped by the NLU module 122-1 is clear. For example, the DM module 122-2 may determine whether the intent of the user is clear based on whether the information of the parameter is sufficient.

The DM module 122-2 may generate the result (response information) of performing the task corresponding to the user input based on the parameter and intent identified by the NLU module 122-1. The DM module 122-2 may obtain information for generating a response sentence based on the intent of the user speech identified through the NLU module 20-2, the data stored in a knowledge base (KB) 122-5, or information received from an external server. For example, in the NLU module 122-1, if obtaining the intent to request information about "today's weather", the user may obtain response information including information related to the today's weather based on the data stored in the knowledge base 122-5.

The NLG generator module 122-3 may output a response sentence for the user speech in a text form in the form of a natural language utterance based on the response information obtained through the DM module 122-2 and the dialogue history information stored in the dialogue history storage 122-6.

A text to speech (TTS) module 122-4 may convert the generated response sentence into speech. The TTS module 122-4 may convert the text obtained through the NLG module 122-3 into speech. Accordingly, the dialogue module 122 may provide a response sentence for the user speech as speech.

The knowledge base 122-5 may store information for a personalized response. The information stored in the knowledge base 122-5 may vary. For example, the knowledge base 122-5 may store information related to a user command input to the electronic apparatus 100, information about an application or content included in the electronic apparatus 100, or the like.

The dialogue history storage 122-6 may store dialogue history information. The dialogue history information is related to the input user speech, and may include information about a response outputted by the speech recognition result, the language analysis result, and the dialogue module 122 before the user speech is input. The dialogue history information may store information on a task performed by the electronic apparatus 100 before the user speech is input.

Figure 4:
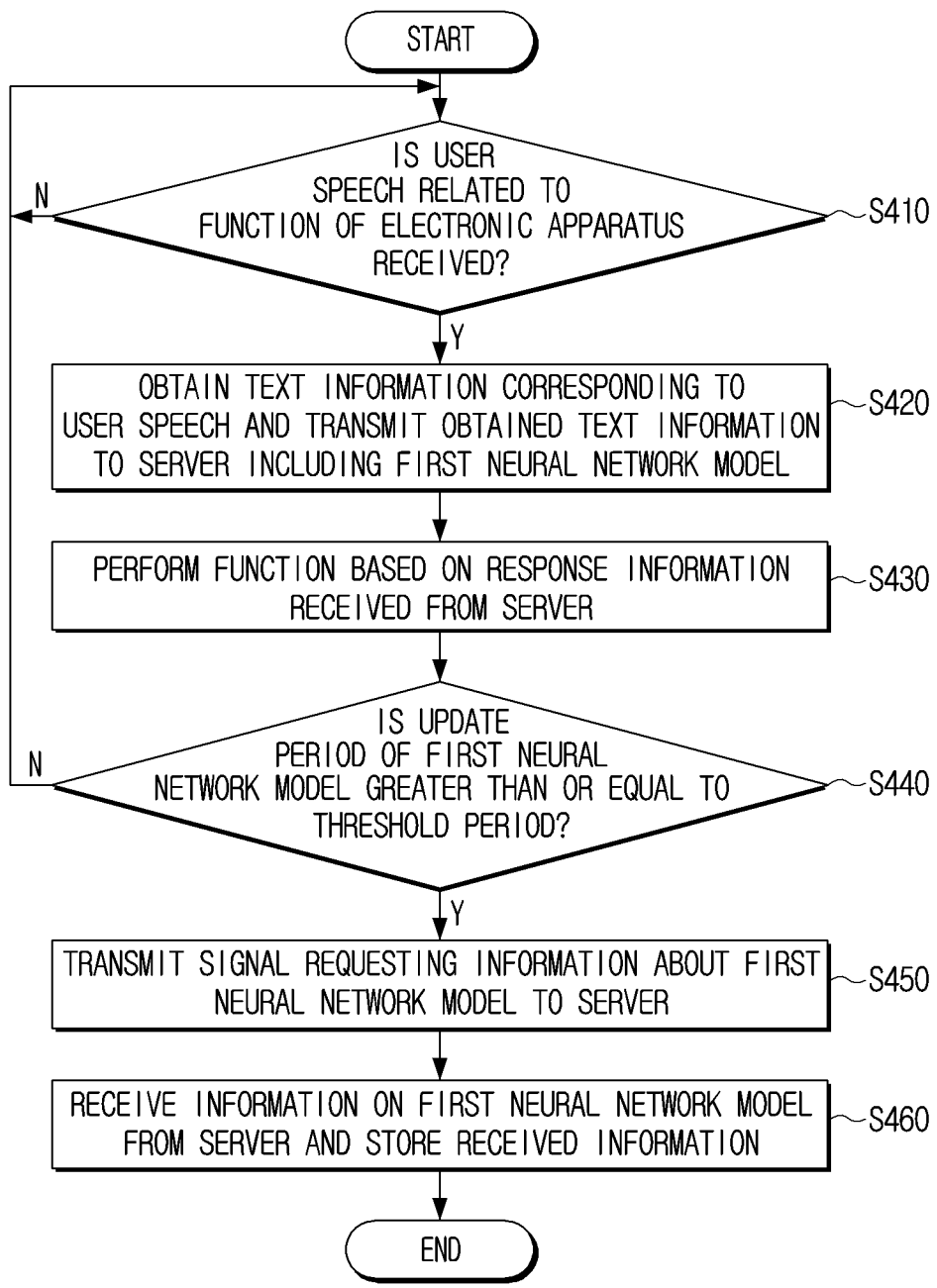
FIG. 4 is a flowchart illustrating an example process of storing a natural language understanding model in an electronic apparatus according to various embodiments.

FIG. 4 is a flowchart illustrating an example process in which a natural language understanding model is stored on an electronic apparatus according to various embodiments. Among the terms used in FIG. 4, the "function of the electronic apparatus" may have the same or similar meaning as the domain identified in FIGS. 3A and 3B. Referring to FIG. 4, a model corresponding to the function of the electronic apparatus among the plurality of natural language understanding models stored in the server is described using the term "first neural network model."

The electronic apparatus 100 according to an embodiment may obtain text information corresponding to user speech when a user speech related to the function of the electronic device is received in operation S410-Y, and may transmit the obtained text information to a server including the first neural network model in operation S420.

In operation S430, the electronic apparatus 100 may perform a function of the electronic apparatus based on the response information received from the server in operation S430. The electronic apparatus 100 may provide a speech recognition assistant service corresponding to a function of the electronic apparatus, and the response information according to an example may include at least one of GUI response information or response information.

According to another example, the electronic apparatus 100 may transmit user speech information to a server, the server may obtain text information corresponding to the speech information, and transmit response information to the electronic apparatus 100 based on the obtained text information.

The electronic apparatus 100 may identify the update period of the first neural network model and if the identified period is greater than or equal to a threshold period in operation S440-Y, the electronic apparatus 100 may transmit a signal requesting information about the first neural network model to the server in operation S450.

In operation S460, the electronic apparatus 100 may receive information on the first neural network model from the server and store the received information in the memory 120 in operation S460. The information on the first neural network model transmitted from the server may refer to all information forming the first neural network model, but may refer to some of the information forming the first neural network model. For example, if only the NLG module 122-3 of the plurality of software modules shown in FIG. 3B is identified to be updated, the server may transmit only information corresponding to the NLG module forming the first neural network model to the electronic apparatus 100.

Figure 5:
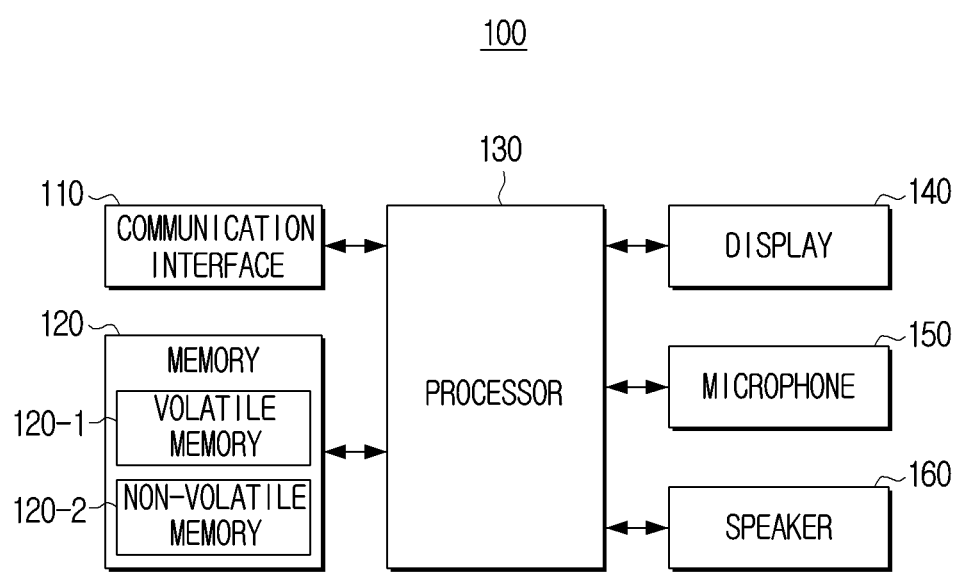
FIG. 5 is a block diagram illustrating an example configuration of an electronic apparatus according to various embodiments.

FIG. 5 is a block diagram illustrating an example configuration of an electronic apparatus according to various embodiments.

Referring to FIG. 5, the electronic apparatus 100 includes the communication interface (e.g., including communication circuitry) 110, the memory 120, the processor (e.g., including processing circuitry) 130, a display 140, a microphone 150, and a speaker 160. A description of the configurations of FIG. 5 overlapping with FIG. 2 may not be repeated here.

The memory 120 according to an embodiment may include the volatile memory 120-1 and the non-volatile memory 120-2.

If the processor 130 receives information on the natural language understanding model from the server and stores the received information in the memory 120, the processor 130 may identify an update period of the natural language understanding model and may store the natural language understanding model in the non-volatile memory 120-2 for a model having a relatively long update period, and may store the stored information in the volatile memory 120-1 for a model having a relatively short update period.

The display 140 includes a display panel to output an image. The display 140 may be implemented as various types of panels such as, for example, and without limitation, a liquid crystal display (LCD), organic light emitting diodes (OLED) display, a quantum dot light-emitting diodes (QLED) display, a plasma display panel (PDP), or the like. In the display 140, a backlight unit, a driving circuit which may be implemented as an a-si TFT, low temperature poly silicon (LTPS) TFT, organic TFT (OTFT), or the like, may be included as well. In the meantime, the display 140 may be implemented as a touch screen coupled with a touch sensor, a flexible display, a third-dimensional (3D) display, or the like.

According to an embodiment, the processor 130, when executing a function of the electronic apparatus based on the response information including the GUI response information, may control the display 140 to provide a GUI corresponding to the response information to the user.

A microphone 150 is configured to receive an acoustic signal. The microphone 150 collectively refers to a device that receives sound wave to generate a current in the same waveform.

The processor 130 may control the microphone 150 to receive a user speech based on a predetermined type of user interaction, obtain a current signal of a waveform corresponding to the received user speech, and identify a domain and an intent corresponding to the user speech.

A speaker 160 may include a device to convert an electrical acoustic signal of the electronic apparatus 100 into a sound wave. The speaker 160 may include a permanent magnet, a coil, and a vibration plate, and may output sound by vibrating a diaphragm by electromagnetic interaction between the permanent magnet and the coil.

When the processor 130 performs the function of the electronic apparatus based on the response information including the speech response information, the processor 130 may control the speaker 160 to output a speech corresponding to the response information.

Figure 6A:
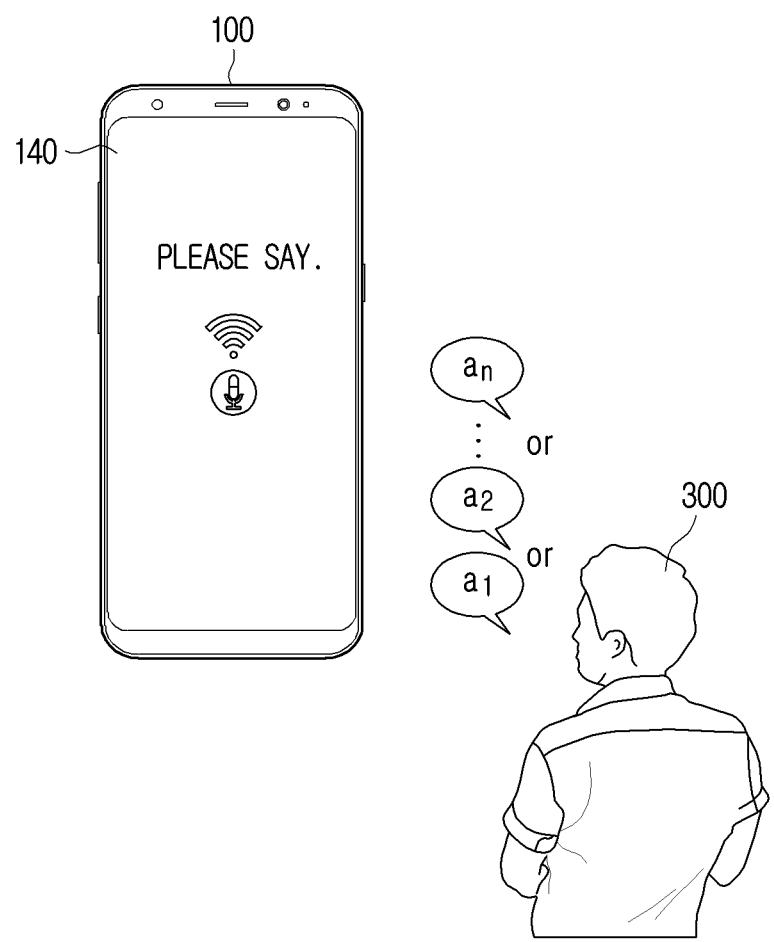
FIGS. 6A and 6B are diagrams illustrating an example method of identifying a lifecycle of a natural language understanding model based on a type or the number of the text corresponding to the user speech according to various embodiments.
Figure 6B:
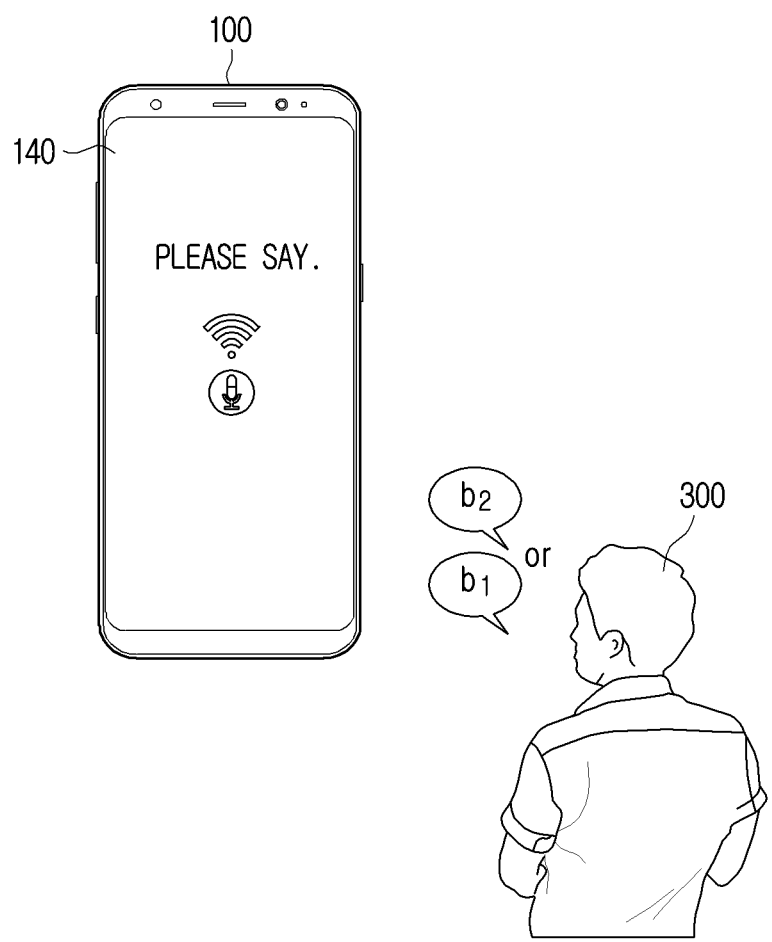

FIGS. 6A and 6B are diagrams illustrating an example method of identifying a lifecycle of a natural language understanding model based on a type or the number of the text corresponding to the user speech according to various embodiments.

The electronic apparatus 100 according to an embodiment may identify an update period of a natural language understanding model corresponding to a function of the electronic apparatus based on the type and number of text corresponding to the user speech associated with the function of the electronic apparatus.

Referring to FIG. 6A, the electronic apparatus 100 may perform a function of A application based on the speech of a user 300 corresponding to the function of the A application installed in the apparatus.

That there are a large number of texts corresponding to the user speech related to a function of the electronic apparatus may refer, for example, to a user speech related to the application function being input in a various form.

The speech of the user 300 related to the function of the A application may be input in various forms, from a1, a2 to an. For example, A application may be a food delivery application. A user with intent to determine a meal menu may utter various speeches such as "what to eat today?" "what I ate yesterday?", "please let me know popular menu," or the like.

Referring to FIG. 6B, the electronic apparatus 100 may execute a function of B application based on the speech of the user 300 corresponding to the B application installed in the electronic apparatus 100.

The speech of the user 300 related to the function of the B application may be input in a limited form, such as b1 and b2. For example, the B application may be a weather application. The user with intent to identify today's weather may make a limited form of utterance, such as "how is the weather today?", "please let me know today's weather."

As the user speech (or text) associated with the function of the electronic apparatus varies, the natural language understanding model corresponding to the function needs to be updated frequently. The electronic apparatus 100 according to an example may identify that the update period of the natural language understanding model corresponding to the A application is shorter than the update period of the natural language understanding model corresponding to the B application.

The electronic apparatus 100 according to an embodiment may identify the update period of the natural language understanding model based on the type of the text corresponding to the user speech related to the function of the electronic apparatus.

When a trend-sensitive type word such as a song title, a name of a singer, or the like, is included in a text corresponding to a user speech, a natural language understanding model corresponding to a music application executing a function based on the speech needs to be updated frequently.

If a type of a word which is not changed for a long period of time, such as a name of a region, is included in the text corresponding to the user speech, the natural language understanding model corresponding to a map application executing the function based on the corresponding speech does not need to be updated frequently.

The electronic apparatus 100 may identify that the update period of the natural language understanding model corresponding to the map application is longer than the update period of the natural language understanding model corresponding to the music application. However, in this case, if the data size of the natural language understanding model corresponding to the map application is greater than or equal to the threshold size, the electronic apparatus 100 may not transmit a signal requesting information about the natural language understanding model corresponding to the map application to the server.

Figure 7A:
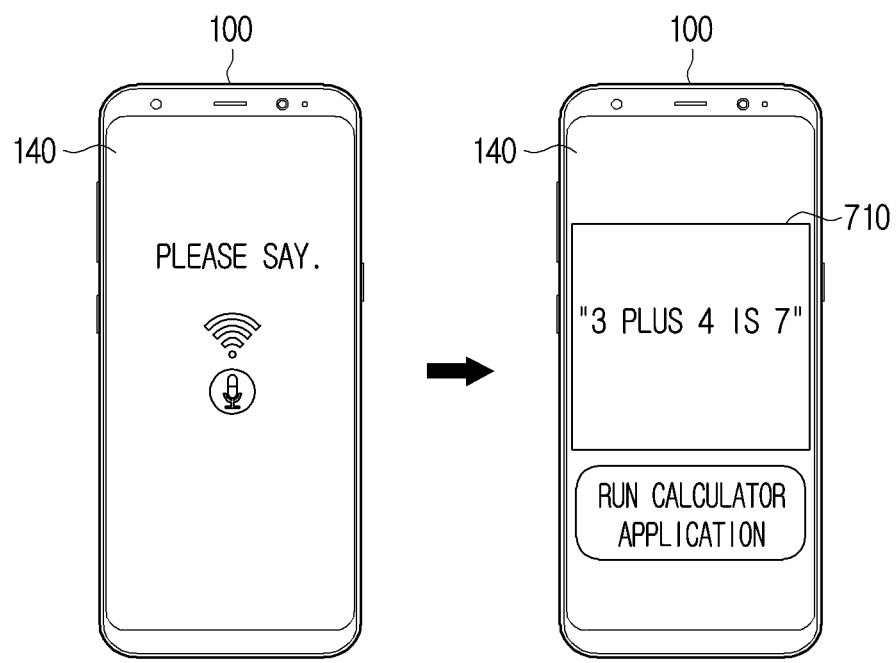
FIGS. 7A and 7B are diagrams illustrating an example method of identifying a life cycle based on whether a function of an application is executed through intervention of a server according to various embodiments.
Figure 7B:
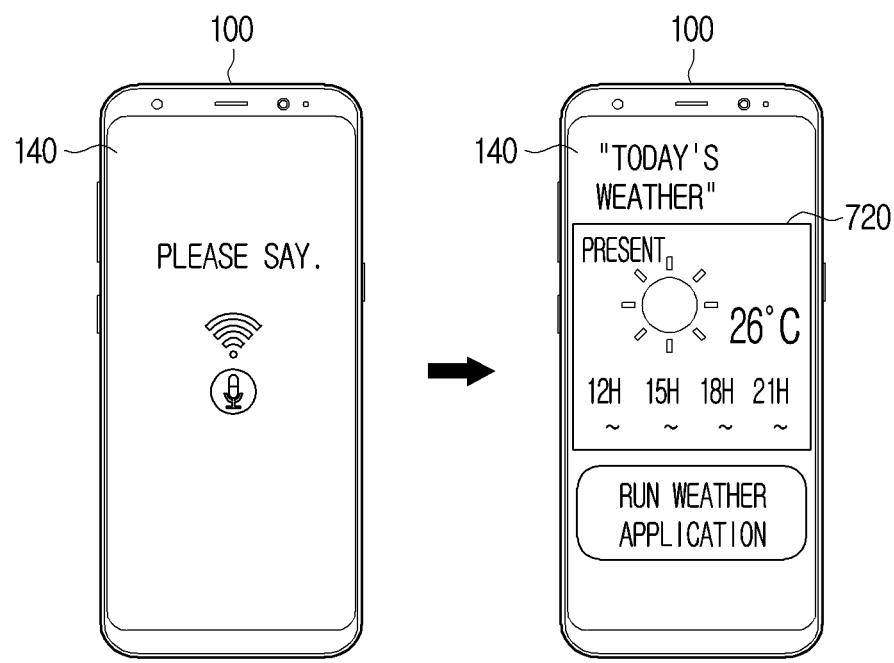

FIGS. 7A and 7B are diagrams illustrating an example method of identifying a life cycle based on whether a function of an application is executed through intervention of a server according to various embodiments.

The electronic apparatus 100 according to an embodiment may identify an update period of a natural language understanding model corresponding to an application executed through the intervention of a server to be shorter than an update period of a natural language understanding model corresponding to an application executed without intervention of a server.

Referring to FIG. 7A, the electronic apparatus 100 may provide a GUI concept on the display 140 based on user speech corresponding to the function of a calculator application. In the case of a calculator application, it is possible to perform a function without intervention of a server, so that natural language processing based on user speech may also be efficiently performed in a terminal.

Referring to FIG. 7B, the electronic apparatus 100 may provide a GUI 720 on the display 140 based on user speech corresponding to a function of the weather application. In the case of a weather application, it is possible to perform a function through the intervention of a server, so that natural language processing based on user speech may also be efficiently performed in the server.

The electronic apparatus 100 may identify that the update period of the natural language understanding model corresponding to the calculator application is longer than the update period of the natural language understanding model corresponding to the weather application.

Figure 8:
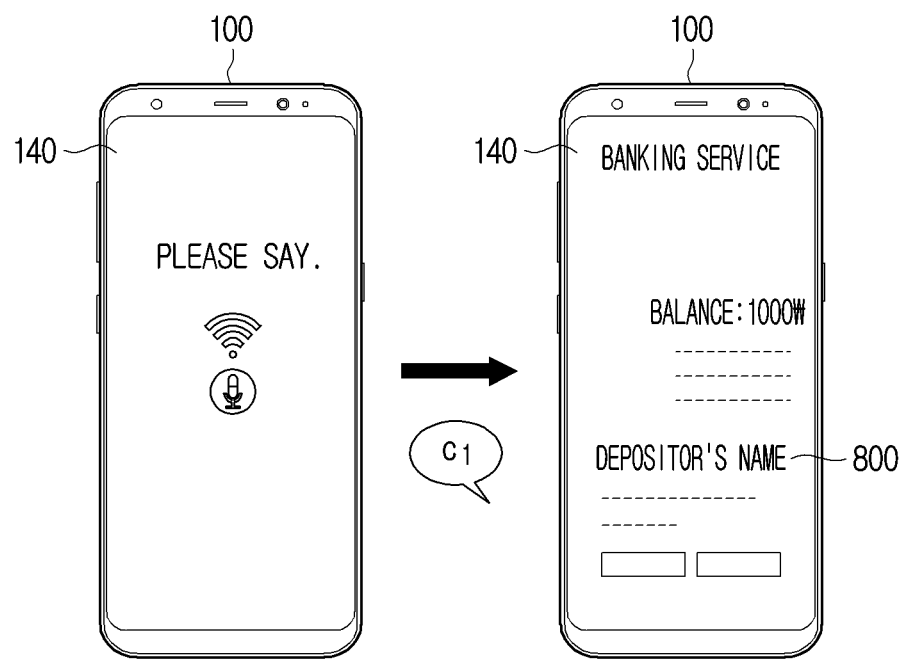
FIG. 8 is a diagram illustrating an example method of identifying a life cycle based on a type of response information related to a function of the electronic apparatus according to various embodiments.

FIG. 8 is a diagram illustrating an example method of identifying a life cycle based on a type of response information related to a function of the electronic apparatus according to various embodiments.

Referring to FIG. 8, the electronic apparatus 100 may execute a bank application based on the user speech corresponding to the bank application and may provide a UI 800 of the bank application on the display 140.

For example, for a bank application, the electronic apparatus 100 may immediately run a bank application without using a speech recognition assistant service based on user speech on a ground of a necessity of personal information protection, or the like. Therefore, as shown in FIGS. 6A and 7B, the electronic apparatus 100 may execute an application without the necessity to provide a separate UI which is a subject of a separate speech recognition assistant service.

In this case, the electronic apparatus 100 may identify the update period of the natural language understanding model corresponding to the application that does not need to provide a separate UI to be longer than the update period of the natural language understanding model corresponding to the application described in FIGS. 6A, 6B, 7A and 7B, since there is only a single type that the response information provided to a user is "execution of another application".

Although not shown in FIG. 8, the type of response information provided to the user may vary as follows. According to an embodiment, the electronic apparatus 100 may identify that the update period of the natural language understanding model is longest in the case of type 1, and the update period becomes shorter as it goes to the lower end of the table, and the update period is shortest in the case of type 5.

TABLE 1

| | |
|---|---|
| Type 1 | Analyze user utterance and perform a function corresponding to an analysis result |
| Type 2 | After analyzing user utterance and performing a function corresponding to an analysis result, provide a pop-up type UI |
| Type 3 | After analyzing user utterance and performing a function corresponding to an analysis result, provide a window-type UI |
| Type 4 | While analyzing user utterance and performing a function corresponding to an analysis result, perform interaction with a user |
| Type 5 | While analyzing user utterance and performing a function corresponding to an analysis result, perform interaction with a user and execute a function in association with another device |

After receiving information on a natural language understanding model corresponding to a function of the electronic apparatus 100 selected as high frequency by a user from the server, the electronic apparatus 100 may store a model having a relatively long update period in a non-volatile memory, and may store a model having a relatively short update period in the volatile memory.

Figure 9:
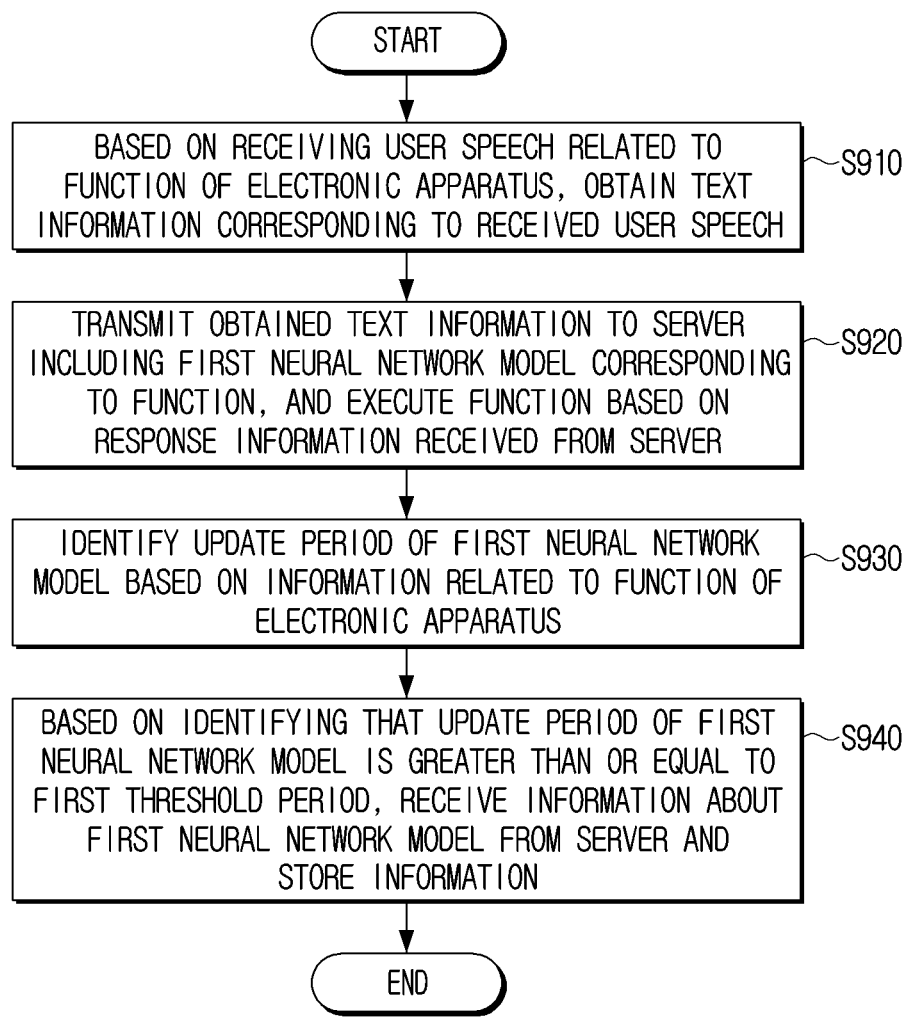
FIG. 9 is a flowchart illustrating an example method of controlling an electronic apparatus according to various embodiments.

FIG. 9 is a flowchart illustrating an example method of controlling an electronic apparatus according to an embodiment.

A method of controlling an electronic apparatus according to an embodiment may include, based on receiving a user speech related to a function of the electronic apparatus, obtaining text information corresponding to the received user speech in operation S910.

The method may include transmitting the obtained text information to a server including a first neural network model corresponding to the function, and executing the function based on response information received from the server in operation S920. The method may include identifying an update period of the first neural network model based on the information related to the function of the electronic apparatus in operation S930.

The method may include, based on identifying that the update period of the first neural network model is greater than or equal to a first threshold period, receiving information about the first neural network model from the server and storing the information in operation S940.

The executing the function in operation S920 may include identifying a function of the electronic apparatus corresponding to the obtained text information by inputting text information corresponding to the user speech to a second neural network model and transmitting the information about the identified function and the obtained text information to the server.

The receiving and storing the information about the first neural network model in operation S940 may include, based on the update period of the first neural network model being greater than or equal to a first threshold period, and the usage frequency for the identified function being greater than or equal to a threshold numeral value, receiving the information about the first neural network model from the server and storing the information.

The receiving and storing the information about the first neural network model in operation S940 may include, based on the update period of the first neural network model being greater than or equal to a first threshold period and a data size of the first neural network model being less than a threshold size, receiving the information about the first neural network model from the server and storing the information.

The method may further include, after the information about the first neural network model is stored in the memory, based on receiving a user speech related to the function of the electronic apparatus, obtaining response information corresponding to the user speech based on the information about the first neural network model.

The identifying an update period of the first neural network model in operation S930 may include identifying an update frequency of the first neural network model based on at least one of a type and number of text corresponding to the user speech related to the function of the electronic apparatus, and a type and number of response information related to the function of the electronic apparatus.

The response information related to the function of the electronic apparatus may include at least one of graphical user interface (GUI) response information or speech response information, and a type of the GUI response information may be different according to at least one of information about whether user interaction is requested or whether another device is in association.

The receiving and storing the information about the first neural network model in operation S940 may include, based on the update period of the first neural network model being greater than or equal to the first threshold period and less than a second threshold period, storing the information about the first neural network model in the volatile memory, and based on the update period of the first neural network model being greater than or equal to the second threshold period, storing the information about the first neural network model in the non-volatile memory.

The second threshold period may be a basic update period for a plurality of neural network models stored in the electronic apparatus.

Figure 10:
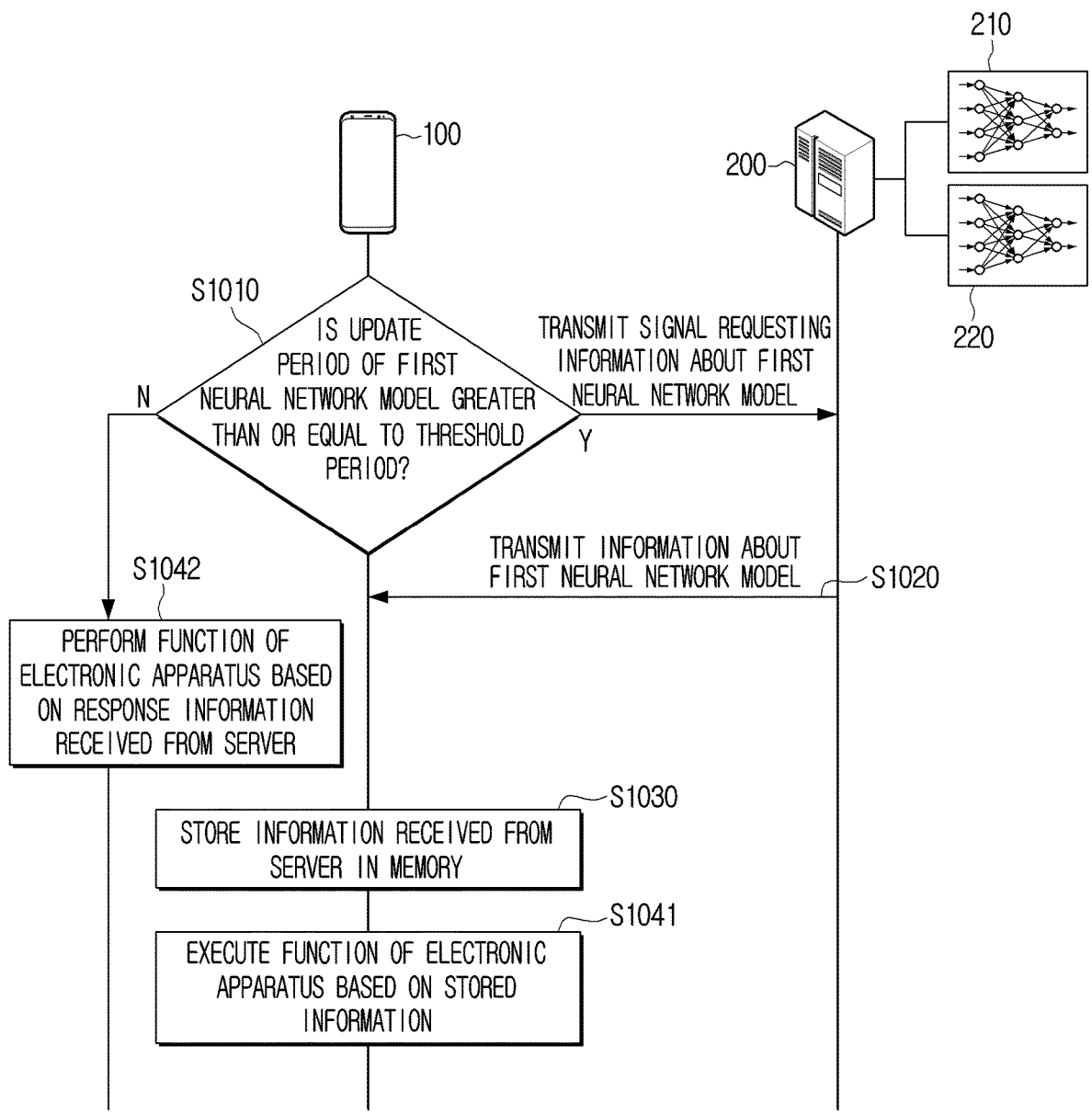
FIG. 10 is a sequence diagram illustrating an example of executing a function of an electronic apparatus according to a user speech through association of an electronic apparatus with a server according to various embodiments.

FIG. 10 is a sequence diagram illustrating an example of executing a function of an electronic apparatus according to a user speech through association of an electronic apparatus with a server according to various embodiments.

The server 200 according to an embodiment may store a first neural network model 210 which is a natural language understanding model corresponding to the user speech and a second neural network model 220 for identifying a function of the electronic apparatus 100 based on the user speech.

The electronic apparatus 100 according to an embodiment may transmit a signal requesting information on the first neural network model to the server 200 when the update period of the first neural network model is greater than or equal to a threshold period S1010-Y.

In operation S1020, the server 200 may transmit information on the first neural network model to the electronic apparatus 100. The electronic apparatus may store information received from the server in a memory in operation S1030, and may execute a function of the electronic apparatus based on the stored information in operation S1041.

When the update period of the first neural network model is less than a threshold period in operation S1010-Y, the electronic apparatus 100 may perform the function of the electronic apparatus based on the response information received from the server in operation S1042.

Methods according to various embodiments as described above may be implemented as an application installable in an existing electronic apparatus.

Methods according to various embodiments as described above may be implemented as software upgrade or hardware upgrade of an existing electronic apparatus.

Embodiments described above may be performed through an embedded server provided in an electronic apparatus, or at least one external server.

The various example embodiments described above may be implemented by a non-transitory computer-readable medium configured to store instructions, and a processor configured to execute the instructions, and may be implemented by software, hardware, or the combination of software and hardware. In some cases, embodiments described herein may be implemented by the processor. According to a software implementation, embodiments such as the procedures and functions described herein may be implemented by separate software modules. Each of the software modules may perform one or more of the functions and operations described herein.

The computer instructions for performing the processing operations of the electronic apparatus 100 according to the various embodiments described above may be stored in a non-transitory computer-readable medium. The computer instructions stored in the non-transitory computer-readable medium cause the above-described specific device to perform the processing operations of the electronic apparatus 100 according to the above-described various embodiments when executed by the processor of the specific device.

The non-transitory computer-readable medium may refer, for example, to a medium that stores data, such as a register, a cache, a memory or etc., and is readable by an apparatus. For example, the aforementioned various applications, instructions, or programs may be stored in the non-transitory computer-readable medium such as, for example, a compact disc (CD), a digital versatile disc (DVD), a hard disc, a Blu-ray disc, a USB drive, a memory card, a read only memory (ROM), and the like.

While the disclosure has been illustrated and described with reference to various example embodiments, it will be understood that the various example embodiments are intended to be illustrative, not limiting. It will further be understood by those of ordinary skill in the art that various changes in form and detail may be made without departing from the true spirit and full scope of the disclosure, including the following claims and their equivalents.

What is claimed is:

1. An electronic apparatus comprising:
   a communication interface;
   a memory; and
   An electronic apparatus comprising:
   a processor connected to the memory and the communication interface, the processor configured to control the electronic apparatus to:
     based on receiving a speech related to a function of the electronic apparatus, obtain text information corresponding to the received speech, control the communication interface to transmit the obtained text information to a server including a first neural network model corresponding to the function, and execute the function based on response information received from the server, and
     based on identifying that an update period of the first neural network model is greater than or equal to a first threshold period, a usage frequency for the function of the electronic apparatus being greater than or equal to a threshold value and a data size of the first neural network model being less than a threshold size based on information related to the function of the electronic apparatus, receive information about the first neural network model from the server and store the information about the first neural network model in the memory, wherein the memory comprises a volatile memory and a non-volatile memory, wherein the processor is further configured to control the electronic apparatus to:
based on the update period of the first neural network model being greater than or equal to the first threshold period and less than a second threshold period, store the information about the first neural network model in the volatile memory, and
based on the update period of the first neural network model being greater than or equal to the second threshold period, store the information about the first neural network model in the non-volatile memory, and wherein the second threshold period is a basic update period for a plurality of neural network models stored in the electronic apparatus.

2. The electronic apparatus of claim 1, wherein the processor is further configured to control the electronic apparatus to:
identify a function of the electronic apparatus corresponding to the obtained text information by inputting text information corresponding to the speech to a second neural network model, and
transmit the information related to the function of the electronic apparatus and the obtained text information to the server.

3. The electronic apparatus of claim 1, wherein the processor is further configured to, after the information about the first neural network model is stored in the memory, based on receiving a speech related to the function of the electronic apparatus, control the electronic apparatus to: obtain response information corresponding to the speech based on the information about the first neural network model stored in the memory.

4. The electronic apparatus of claim 1, wherein the processor is further configured to control the electronic apparatus to: identify an update frequency of the first neural network model based on at least one of a type and number of text corresponding to the speech related to the function of the electronic apparatus, and a type and number of response information related to the function of the electronic apparatus.

5. The electronic apparatus of claim 4, wherein the response information related to the function of the electronic apparatus comprises at least one of graphical user interface (GUI) response information or speech response information,
wherein a type of the GUI response information is different based on at least one of information about whether user interaction is requested or whether another device is in association.

6. A system comprising an electronic apparatus and a server, comprising:
the electronic apparatus configured to:
based on receiving a speech related to a function of the electronic apparatus, obtain text information corresponding to the received speech, transmit the obtained text information to the server, the server including a first neural network model corresponding to the function, execute the function based on response information received from the server, and
based on identifying that an update period of the first neural network model is greater than or equal to a first threshold period, a usage frequency for the function of the electronic apparatus being greater than or equal to a threshold value and a data size of the first neural network model being less than a threshold size based on information related to the function of the electronic apparatus, transmit a signal requesting information about the first neural network model to the server; and
the server configured to, based on receiving a signal requesting the information about the first neural network model from the electronic apparatus, transmit the information about the first neural network model to the electronic apparatus,
wherein the electronic apparatus is further configured to store the information about the first neural network model received from the server in a memory,
wherein the memory comprises a volatile memory and a non-volatile memory, wherein the electronic apparatus is further configured to:
based on the update period of the first neural network model being greater than or equal to the first threshold period and less than a second threshold period, store the information about the first neural network model in the volatile memory, and
based on the update period of the first neural network model being greater than or equal to the second threshold period, store the information about the first neural network model in the non-volatile memory, and
wherein the second threshold period is a basic update period for a plurality of neural network models stored in the electronic apparatus.

7. A method of controlling an electronic apparatus, the method comprising:
based on receiving a speech related to a function of the electronic apparatus, obtaining text information corresponding to the received speech;
transmitting the obtained text information to a server including a first neural network model corresponding to the function, and executing the function based on response information received from the server;
identifying an update period of the first neural network model based on information related to the function of the electronic apparatus; and
based on identifying that the update period of the first neural network model is greater than or equal to a first threshold period, a usage frequency for the function of the electronic apparatus being greater than or equal to a threshold value and a data size of the first neural network model being less than a threshold size based on information related to the function of the electronic apparatus, receiving information about the first neural network model from the server and storing the information about the first neural network model,
based on the update period of the first neural network model being greater than or equal to the first threshold period and less than a second threshold period, storing the information about the first neural network model in a volatile memory, and
based on the update period of the first neural network model being greater than or equal to the second threshold period, storing the information about the first neural network model in a non-volatile memory, wherein the second threshold period is a basic update period for a plurality of neural network models stored in the electronic apparatus.

8. The method of claim 7, wherein the executing the function comprises:
identifying a function of the electronic apparatus corresponding to the obtained text information by inputting text information corresponding to the speech to a second neural network model; and
transmitting the information related to the function of the electronic apparatus and the obtained text information to the server.

9. The method of claim 7, further comprising:
after the information about the first neural network model is stored in the memory, based on receiving a speech related to the function of the electronic apparatus, obtaining response information corresponding to the speech based on the information about the first neural network model.

10. The method of claim 7, further comprising:
identifying an update frequency of the first neural network model based on at least one of a type and number of text corresponding to the speech related to the function of the electronic apparatus, and a type and number of response information related to the function of the electronic apparatus.

11. The method of claim 10, wherein the response information related to the function of the electronic apparatus comprises at least one of graphical user interface (GUI) response information or speech response information,
wherein a type of the GUI response information is different based on at least one of information about whether user interaction is requested or whether another device is in association.

* * * * *